United States Patent
Olsen et al.

(10) Patent No.: US 8,851,277 B2
(45) Date of Patent: Oct. 7, 2014

(54) CONVEYOR

(75) Inventors: Jesper Olsen, Hadsten (DK); Steffen Olsen, Hadsten (DK)

(73) Assignee: Flexmove System (M) SDN. BHD., Penang (MY)

( * ) Notice: Subject to any disclaimer, the term of this patent is extended or adjusted under 35 U.S.C. 154(b) by 0 days.

(21) Appl. No.: 13/824,257

(22) PCT Filed: Oct. 26, 2011

(86) PCT No.: PCT/DK2011/000118
§ 371 (c)(1),
(2), (4) Date: Mar. 29, 2013

(87) PCT Pub. No.: WO2012/059101
PCT Pub. Date: May 10, 2012

(65) Prior Publication Data
US 2013/0180833 A1 Jul. 18, 2013

(30) Foreign Application Priority Data
Nov. 2, 2010 (DK) .................................. 2010 00990

(51) Int. Cl.
*B65G 21/02* (2006.01)
*B65G 15/62* (2006.01)

(52) U.S. Cl.
CPC ............ *B65G 15/62* (2013.01); *B65G 2207/26* (2013.01); *B65G 21/02* (2013.01)
USPC ....................... 198/860.3; 198/860.1; 198/493

(58) Field of Classification Search
CPC ......... B65G 21/00; B65G 21/02; B65G 21/08
USPC .............. 198/860.3, 860.01, 861.1, 493, 495
See application file for complete search history.

(56) References Cited

U.S. PATENT DOCUMENTS 3,848,732 A * 11/1974 Catalano ..................... 198/836.1
3,998,321 A * 12/1976 Schultz ........................ 198/495

(Continued)

FOREIGN PATENT DOCUMENTS

EP 0 842 876 A1 5/1998
EP 1 826 157 A1 8/2007

(Continued)

OTHER PUBLICATIONS

International Search Report issued in PCT Application No. PCT/DK2011/000118 dated Jan. 24, 2012.

(Continued)

*Primary Examiner* — Gene Crawford
*Assistant Examiner* — Keith R Campbell
(74) *Attorney, Agent, or Firm* — Abraham Hershkovitz; Hershkovitz & Associates, PLLC

(57) ABSTRACT

The present invention relates to a conveyor system (2) comprising a support frame (4) and an endless carrier chain (6) arranged horizontally thereon and defining an upper part (6a) and a lower part (6b); the carrier chain thereby having an inner side (12) and an outer side (14);
wherein the support frame comprises a shielding element (24) in an area (A) defined between the inner side (12a) of the upper part of the carrier chain (6) and the inner side (12b) of the lower part of the carrier chain (6); wherein the shielding element (24) itself, or in combination with the first main support element (16) and/or the second main support element (18) having an extension that blocks a direct access between any point P1 located on the inner side (12a) of the upper part of the carrier chain (6) and a corresponding point P2 located on the inner side (12b) of the lower part of the carrier chain.

17 Claims, 5 Drawing Sheets

(56) References Cited

U.S. PATENT DOCUMENTS

| | | | |
|---|---|---|---|
| 4,013,167 A * | 3/1977 | Bourgeois | 198/860.2 |
| 4,967,897 A * | 11/1990 | Lachonius et al. | 198/841 |
| 5,178,263 A * | 1/1993 | Kempen | 198/836.1 |
| 5,186,314 A * | 2/1993 | Clopton | 198/860.2 |
| 5,220,989 A * | 6/1993 | Smith | 198/347.4 |
| 5,649,616 A | 7/1997 | Stecklow | |
| 5,788,056 A * | 8/1998 | Clopton | 198/779 |
| 5,810,153 A * | 9/1998 | Zimmerman et al. | 198/495 |
| 6,401,912 B1 * | 6/2002 | Bandy, Jr. | 198/735.4 |
| 6,422,382 B1 * | 7/2002 | Ertel et al. | 198/860.1 |
| 6,848,572 B1 * | 2/2005 | Sisson et al. | 198/860.1 |
| 6,913,139 B2 * | 7/2005 | Abbestam et al. | 198/860.1 |
| 8,662,292 B2 * | 3/2014 | Brackemyer et al. | 198/841 |
| 2004/0211652 A1 * | 10/2004 | Abbestam et al. | 198/860.1 |
| 2008/0093199 A1 * | 4/2008 | Reynebeau et al. | 198/496 |

FOREIGN PATENT DOCUMENTS

| | | |
|---|---|---|
| GB | 2 111 011 A | 6/1983 |
| WO | WO 02/02440 A1 | 1/2002 |
| WO | WO 02/100746 A1 | 12/2002 |

OTHER PUBLICATIONS

Danish Search Report dated Jun. 10, 2011.
International Preliminary Report on Patentability issued in PCT Application No. PCT/DK2011/000118, dated May 7, 2013.

* cited by examiner

CONVEYOR

TECHNICAL FIELD

The present invention relates in a first aspect to a conveyor system. The present invention relates in a second aspect to a conveyor apparatus comprising a conveyor system according to the first aspect. The present invention relates in a third aspect to the use of a conveyor system according to the first aspect or a conveyor apparatus according to the second aspect for conveying an object.

BACKGROUND OF THE INVENTION

Conveyor apparatuses have been known for decades. A conveyor apparatus provides a simple and price efficient was of moving goods or objects within relative small distances, such as within a factory or a processing plant. Accordingly, conveyor apparatuses find use in a variety of different manufacturing and processing industries, such as in the food industry.

A conveyor apparatus in the general form comprises a support frame supporting an endless carrier chain. The endless carrier chain is mounted on the support frame via at least two bearings, typically arranged at the opposite ends of the support frame. Drive means, such as an electrical motor is typically comprised in the apparatus and the drive means provides motion to the endless carrier chain.

Within the food industry a food manufacturing company in its processing line often needs to transport a food object in a non-packaged state from one part of the manufacturing plant to another part of the processing plant along the line defined by the various processing steps. For this purpose, use of a conveyor apparatus is an obvious choice.

A conveyor apparatus due to its construction comprises many hidden surfaces and corners, which may form the foundation for accumulation of debris. Such deposits of debris may in turn lead to accumulation of various microorganisms.

In the food industry deposits of microorganisms in processing equipment are highly undesirably.

Moreover, in most countries increasingly strict legislation regulating the requirements to hygiene in food manufacturing industries persistently imposes increasingly strict standards to the hygiene of the equipment used.

The sources for contamination or soiling of a conveyor apparatus within the food industry are at least two-fold. One source of contamination or soil is associated with deposits from the surrounding environment originating from dust, moist and various particles from the air. Another source of contamination or soil is associated with debris originating from the conveyed objects themselves.

In order to reduce the extent of the problems associated with deposits from the surrounding environment of dust, moist and various particles in hidden areas in a conveyor apparatus one specific design of a conveyor apparatus has been suggested and put on the marked by the Swedish company Flexlink under the product name XMX. The XMX conveyor apparatus comprises a support frame extending in a longitudinal direction and an endless carrier chain in the form of a multiflexing chain. The multiflexing chain defines an upper part moveable in one direction in relation to said support frame; and a lower part moveable in the opposite direction in relation to said upper part of said carrier chain. The upper part of the multiflexing chain is accommodated in an upper part of the support frame, whereas the lower part of the multiflexing chain is accommodated in a lower part of the support frame. When seen in cross-sectional profile, the longitudinal support frame itself comprises a rectangular element having a first side and a second side. The upper part of the profiles comprises an opening for accommodating the multiflexing chain. Likewise, the lower part of the profile comprises a small opening for accommodating the multiflexing chain. The two sides each comprises an opening extending in a longitudinal direction. These openings provides for inlet of rinsing liquids during a rinsing procedure, yet the support frame of the XMX system is still relatively closed thus reducing the risk of deposits of debris from the surrounding environment. The principle of the XMX system is outlined in FIG. 1.

A problem associated with the XMX system is that debris that once has deposited on the upper part of the support frame may over time come off and fall down. When such debris falls down it may attach itself to various parts of the lower part of the support frame.

In order to solve the first problem of XMX system as mentioned above, the Flexlink company has markedet an improved conveyor apparatus; viz. the XMY conveyor apparatus. The XMY conveyor apparatus comprises a support frame extending in a longitudinal direction and an endless carrier chain in the form of a multiflexing chain. The multiflexing chain defines an upper part moveable in one direction in relation to said support frame; and a lower part moveable in the opposite direction in relation to said upper part of said carrier chain. The upper part of the multiflexing chain is accommodated in an upper part of the support frame, whereas the lower part of the multiflexing chain is accommodated in a lower part of the support frame. The upper part of the support frame and the lower part of the support frame are completely separated from each other except at specific points located along the longitudinal direction of the support frame, where the two parts are fastened to each other.

The upper part of the support frame comprises two side walls at a first side and a second side of the support frame, respectively. The upper part of the support frame thus comprises an opening at the top in which the multiflexing chain is accommodated. The design of the lower part of the support is characteristic in that it has a profile, in a direction perpendicular to the direction of movement of the multiflexing chain, defining an opposite V or U. That is, the lower part of the support frame of the XMY system is complete closed at the top, but comprises a longitudinal opening at the bottom, in which the lower part of the multiflexing chain is accommodated. The principle of the XMY system is outlined in FIG. 2. Accordingly, due to the side walls of the upper support part and due to Opposite V or U profile of the bottom part of the support frame of the XMY system, the XMY conveyor apparatus comprises a relatively closed structure which to a great extent reduced the problems of deposition of e.g. dust, moist and various particles from the surrounding environment, and thereby the XMY system also reduced the problems associated with microbiological growth in these particle deposits. Also, the XMY apparatus avoid the problem that debris originating from the upper part of the multiflexing chain deposits onto the lower part of the multiflexing chain.

As mentioned above, another type of contamination or soiling of the various parts of a conveyor apparatus is present in the situations in which unpackaged food objects are transported on a conveyor apparatus. In such a situation the soiling of the conveyor apparatus originates from the conveyed objects themselves, i.e. the unpackaged food objects.

Accordingly, in using a conveyor apparatus for transporting unpackaged food objects inevitably results in debris in the form of small parts of the food objects will fall off the food object. Such debris may constitute protein material, carbohydrate material and fats originating from the food object.

A part of such debris may stick to various parts of the conveyor apparatus where it will decay over time and thereby form the foundation of growth of various species of microorganisms.

As a consequence, a conveyor apparatus used for transporting unpackaged food objects in a food processing industry needs thorough and frequent cleaning.

The cleaning procedures are performed manually by a worker washing the conveyor apparatus with a cleansing liquid, brushing the dirty parts with a brush and subsequently rinsing the apparatus with water.

Although such cleaning procedure may leave the conveyor apparatus in a state that fulfils the requirement set by the legislation as to hygiene, such cleaning procedures are labour heavy and tedious work.

It is clear that due to the closed structure of the support frame with no or only limited possibility for mechanical cleaning (i.e. by using a brush or the like), neither one of the above referenced XMX system and the XMY system from the company Flexlink is really suitable for conveying unpackaged food objects; this is especially the case in respect of meat products and the like.

Accordingly, there exists a need for an improved conveyor system which is suitable for conveying unpackaged food products, and which provides for improved possibilities for fast and easy, yet efficient cleaning.

BRIEF DESCRIPTION OF THE INVENTION

Those needs are fulfilled according to a first, a second and a third aspect of the present invention.

In the first aspect, the present invention relates to a conveyor system 2 comprising a support frame 4 and an endless carrier chain 6;
wherein said support frame extends in a longitudinal direction and comprises a first side 8 and a second side 10;
wherein said endless carrier chain 6 is arranged upon said support frame 4;
wherein in an orientation intended for use, in which the endless carrier chain 6 is arranged in a horizontally orientation, said endless carrier chain 6 defines an upper part 6a moveable in one direction in relation to said support frame; and a lower part 6b moveable in the opposite direction in relation to said upper part of said carrier chain; said endless carrier chain thereby having an inner side 12 and an outer side 14;
wherein said support frame comprises a first main support element 16 supporting the upper part of the endless carrier chain at the first side 8 of the support frame;
wherein said support frame comprises a second main support element 18 supporting the lower part of the endless carrier chain at the second side 10 of the support frame;
wherein said support frame comprises a first auxiliary support element 20 supporting the upper part of the endless carrier chain at the second side 10 of the support frame;
wherein said support frame comprises a second auxiliary support element 22 supporting the lower part of the endless carrier chain at the first side 8 of the support frame;
wherein said support frame comprises a shielding element 24 extending from the first side 8 of the support frame to the second side 10 of the support frame in an area A defined between the inner side 12a of the upper part of the endless carrier chain 6 and the inner side 12b of the lower part of the endless carrier chain 6;
characterised in that said shielding element 24 itself, or said shielding element 24 in combination with said first main support element 16 and/or in combination with said second main support element 18 having an extension that blocks a direct access between any point P1 located on the inner side 12a of the upper part of the endless carrier chain band a corresponding point P2 located on the inner side 12b of the lower part of the endless carrier chain, said point P2 being the most proximal point, in relation to the point P1, on the inner side 12b of the lower part of the endless carrier chain.

In the second aspect, the present invention relates to a conveyor apparatus comprising a conveyor system according to the first aspect of the present invention and further comprising drive means for moving the endless carrier chain relative to the support frame 4.

In the third aspect, the present invention relates to a use of a conveyor system according to the first aspect of the present invention or a conveyor apparatus according to the second aspect of the present invention for conveying an object.

The combination of the technical features of the invention according to a first aspect provides for improved hygiene in conveyor systems because the conveyor system according to the first aspect eliminates the movement of spillage of debris which has been deposited at an upper part of the carrier chain from said upper part of the carrier chain to the lower part of the carrier chain, on the one hand; and on the other hand provides for better access to the various parts of the carrier system with in a cleaning process.

Such possibilities of improvements in hygiene in a conveyor system is highly desirable in various industries, such as in the food or dairy industries.

FIGURES

DETAILED DESCRIPTION OF THE INVENTION

Figure 1:
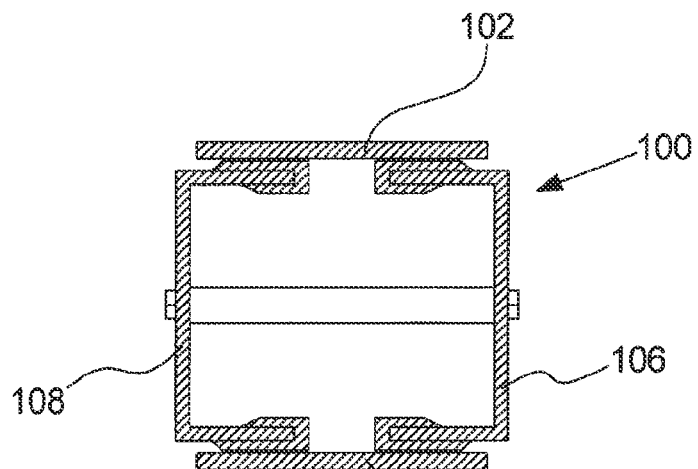
FIG. 1 is a cross-sectional view illustrating the principles of a prior art conveyor system.

As mentioned above, the present invention in a first aspect relates to a conveyor system 2 comprising a support frame 4 and an endless carrier chain 6;
wherein said support frame extends in a longitudinal direction and comprises a first side 8 and a second side 10;
wherein said endless carrier chain 6 is arranged upon said support frame 4;
wherein in an orientation intended for use, in which the endless carrier chain 6 is arranged in a horizontally orientation, said endless carrier chain 6 defines an upper part 6a moveable in one direction in relation to said support frame; and a lower part 6b moveable in the opposite direction in relation to said upper part of said carrier chain; said endless carrier chain thereby having an inner side 12 and an outer side 14;

wherein said support frame comprises a first main support element 16 supporting the upper part of the endless carrier chain at the first side 8 of the support frame;

wherein said support frame comprises a second main support element 18 supporting the lower part of the endless carrier chain at the second side 10 of the support frame;

wherein said support frame comprises a first auxiliary support element 20 supporting the upper part of the endless carrier chain at the second side 10 of the support frame;

wherein said support frame comprises a second auxiliary support element 22 supporting the lower part of the endless carrier chain at the first side 8 of the support frame;

wherein said support frame comprises a shielding element 24 extending from the first side 8 of the support frame to the second side 10 of the support frame in an area A defined between the inner side 12a of the upper part of the endless carrier chain 6 and the inner side 12b of the lower part of the endless carrier chain 6;

characterised in that said shielding element 24 itself, or said shielding element 24 in combination with said first main support element 16 and/or in combination with said second main support element 18 having an extension that blocks a direct access between any point P1 located on the inner side 12a of the upper part of the endless carrier chain 6 and a corresponding point P2 located on the inner side 12b of the lower part of the endless carrier chain, said point P2 being the most proximal point, in relation to the point P1, on the inner side 12b of the lower part of the endless carrier chain.

The conveyor system according to a first aspect of the present invention comprises an endless carrier chain 6 supported support frame 4 and the support frame having a first side 8 and a second side 10. The support frame extends in a longitudinal direction. The term "in a longitudinal direction" in the present description and in the appended claims shall be not be interpreted as necessarily mean that the support frame extends in a linear direction. Rather the term "in a longitudinal direction" shall be interpreted as being the direction along the path of movement defined by the carrier chain. Hence, the carrier chain and consequently the support frame may very well extend in a linear direction, a sideward curved direction, a vertically curved direction or any combination thereof.

In order to define the various directions of the conveyor system, the system is defined with reference to an orientation intended for use in which the endless carrier chain or part thereof is arranged in a horizontal orientation.

Figure 3:
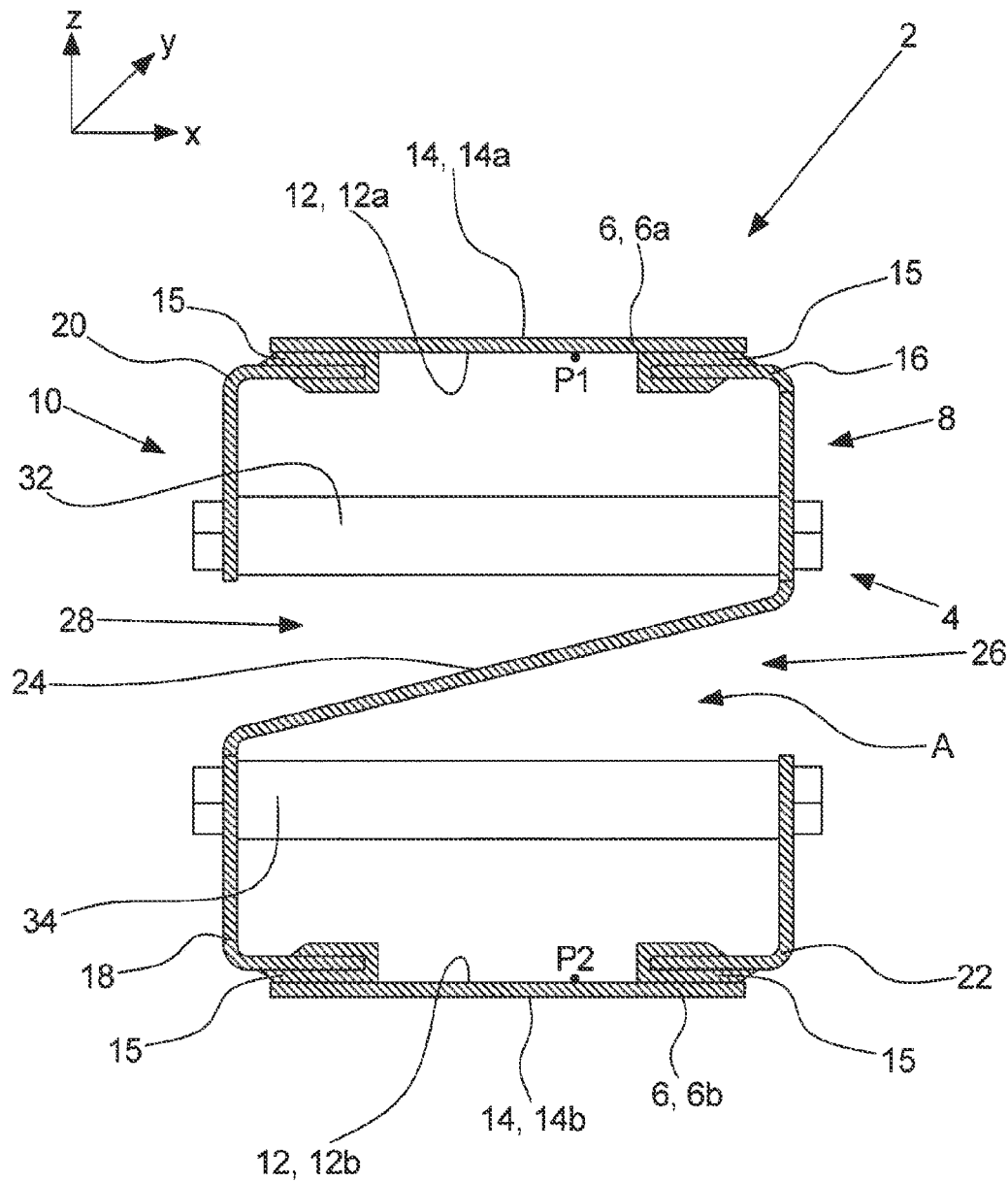
FIG. 3 is a cross-sectional view illustrating the principles of the conveyor system according to the first aspect of the present invention.
Figure 4:
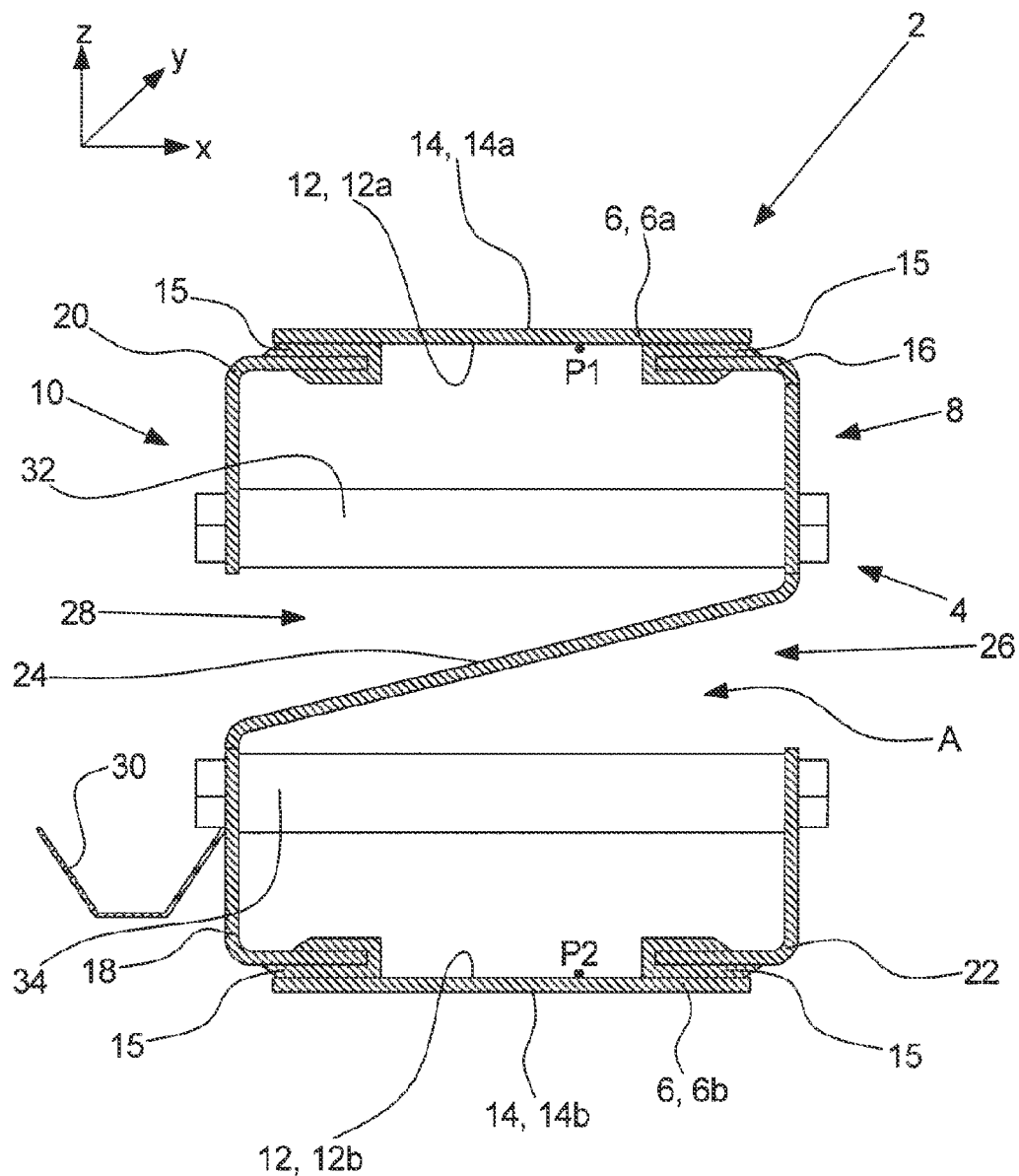
FIG. 4 is a cross-sectional view illustrating an embodiment of the conveyor system according to the first aspect of the present invention.

In FIGS. 3 and 4 the z-direction of the Cartesian coordinate system defines the longitudinal direction; the z-direction is the vertical direction; and the xy-plane is the horizontal plane.

In the orientation as set out in claim 1, said endless carrier chain 6 defines an upper part 6a moveable in one direction in relation to said support frame; and a lower part 6b moveable in the opposite direction in relation to said upper part of said carrier chain; said endless carrier chain thereby having an inner side 12 and an outer side 14.

The support frame itself comprises a first main support element 16 supporting the upper part of the endless carrier chain at the first side 8 of the support frame; a second main support element 18 supporting the lower part of the endless carrier chain at the second side 10 of the support frame; a first auxiliary support element 20 supporting the upper part of the endless carrier chain at the second side 10 of the support frame; and a second auxiliary support element 22 supporting the lower part of the endless carrier chain at the first side 8 of the support frame. These support elements serve the purpose of supporting the endless carrier chain along its path of movement.

The advantage of avoiding that debris located and deposited at the upper part of the endless carrier chain or located at the upper part of the support frame finds it way down to the lower part of the endless carrier chain or to the lower part of the support frame is brought about by the shielding element 24 extending from the first side 8 of the support frame to the second side 10 of the support frame in an area A defined between the inner side 12a of the upper part of the endless carrier chain 6 and the inner side 12b of the lower part of the endless carrier chain 6.

The shielding element itself, optionally in combination with said first main support element 16 and/or in combination with said second main support element 18 of the conveyor system according to the first aspect of the present invention accordingly having an extension that blocks a direct access between any point P1 located on the inner side 12a of the upper part of the endless carrier chain 6 and a corresponding point P2 located on the inner side 12b of the lower part of the endless carrier chain, said point P2 being the most proximal point, in relation to the point P1, on the inner side 12b of the lower part of the endless carrier chain.

Such blocked path between any point P1 on the located on the inner side 12a of the upper part of the endless carrier chain 6 and a corresponding point P2 located on the inner side 12b of the lower part of the endless carrier chain on the inner side 12b of the lower part of the endless carrier chain prevents that debris falling down will attach itself to the lower part of the endless carrier chain 6 or to the lower part of the support frame.

It is clear that near the ends of the support frame, the endless carrier chain 6 during use will change direction of movement in one longitudinal direction to a direction of movement in the opposite direction in going from being the upper part 6a of the endless carrier chain to being the lower part 6b of the endless carrier chain.

It should be noted that the point P1 is located on the innerside 12a of the upper part 6a of the carrier chain at a location where a fixed point located on said carrier chain has not yet initiated/concluded—during use of the carrier chain—its change of direction from one direction to the opposite direction along the longitudinal direction.

In this way it is clear that the restriction relating to the blocking passage between the point P1 located on the inner side 12a of the upper part of the endless carrier chain 6 and a corresponding point P2 located on the inner side 12b of the lower part of the endless carrier chain applies preferably to the area of the endless carrier chain 6 not being located near the extreme ends of the support frame. As mentioned, near the ends of the support frame, the endless carrier chain 6 will change direction of movement in one longitudinal direction to a direction of movement in the opposite direction in going from being the upper part 6a of the endless carrier chain to being the lower part 6b of the endless carrier chain. Along the path of change of direction of movement, there may thus be two points located on the inner side 12a of an upper part of the endless carrier chain 6 and located on the inner side 12b of a lower part of the endless carrier chain, respectively, between which no blocking of passage is present. Accordingly, the restriction relating to the blocking passage between the point P1 located on the inner side 12a of the upper part of the endless carrier chain 6 and a corresponding point P2 located on the inner side 12b of the lower part of the endless carrier chain shall be interpreted to apply to all the path of the endless carrier chain except near the two extreme ends E of the carrier chain at which ends a fixed point on the endless carrier chain will change direction from moving in one longitudinal direction to moving in the opposite direction.

It is preferred that the restriction relating to the blocking passage between the point P1 located on the inner side 12a of the upper part of the endless carrier chain 6 and a corresponding point P2 located on the inner side 12b of the lower part of the endless carrier chain shall be interpreted to apply to all the path of the endless carrier chain except at a distance in the longitudinal direction from each of the two extreme ends E of the carrier chain independently selected from the ranges: 50 cm or less, such as 40 cm or less, for example 30 cm or less, such as 25 cm or less, e.g. 20 cm or less, for example 15 cm or less, such as 10 cm or less, or 5 cm or less.

Hence, in one embodiment of the invention according to the first aspect of the present invention, the shielding element 24 extends all the way along the longitudinal direction of the endless carrier chain except 50 cm or less, such as 40 cm or less, for example 30 cm or less, such as 25 cm or less, e.g. 20 cm or less, for example 15 cm or less, such as 10 cm or less, or 5 cm or less from the two most extreme ends of said carrier chain.

In another embodiment of the invention according to the first aspect of the present invention, the shielding element 24 extends all the way between the two most extreme ends of said carrier chain, along the longitudinal direction of the endless carrier chain.

In another embodiment of the invention according to the first aspect of the present invention, the shielding element 24 extends 75% or more, such as 80% or more, e.g. 85% or more, such as 90% or more or 95% or more of the path the carrier chain defined between the two most extreme ends E of said carrier chain of along the longitudinal direction.

In a preferred embodiment according to the first aspect of the present invention, the first side 8 of the support frame 4 comprising an opening 26, preferably extending alongside essentially all said first side in the longitudinal direction, said opening 26 providing access to the inner side 12b of the lower part 6b of the endless carrier chain 6; said opening 26 being defined by the geometry of the first main support element 16, the shielding element 24 and the second auxiliary support element 22; and/or said second side 10 of the support frame 4 comprising an opening 28, preferably extending alongside essentially all said second side in the longitudinal direction, said opening 28 providing access to the inner side 12a of the upper part 6a of the endless carrier chain 6; said opening 28 being defined by the geometry of the second main support element 18, the shielding element 24 and the second auxiliary support element 20.

The openings 26 and/or 28 provides for better access to the interior of the support frame and to the inner side of the endless carrier train, thereby providing improved possibilities for thorough cleaning either by brush or by using pressurised water, such as by using a foam gun.

In a preferred embodiment according to the first aspect of the present invention, the shielding element 24 at least partly in the area A defines a planar surface extending in an inclined orientation, relative to a horizontal plane, from the first side of the support frame to the second side of the support frame.

Providing the shielding element with an inclined orientation provides for better drain off of rinsing water in a rinsing situation. It is preferred that the inclination of the shielding element is within the range of 5-60°, såsom 10-55°, e.g. 15-50°, for example 20-45°, such as 25-40° or 30-35° in relation to the horizontal plane.

In another preferred embodiment according to the first aspect of the present invention, the first main support element 16 at one or more specific locations 23 along the first side of the support frame is connected to the second auxiliary support element 22 and/or wherein the second main support element 18 at one or more specific locations 23 along the second side of the support frame is connected to the first auxiliary support element 20.

Connecting the first main support elements to the second auxiliary support elements at one or more specific locations 23 along the first side and/or the second side of the support frame provides for a more sturdy construction and thus improves the integrity of the support frame and thereby of the conveyor system.

In yet another preferred embodiment according to the first aspect of the present invention, a gutter 30 is arranged on the second main support element 18 for collection of rinse water in a rinsing situation, said gutter 30 extending in a longitudinal direction of the support frame 4.

Providing the support element with such a gutter enables collection of the rinse water which may be applied to the upper part of the conveyor system in a rinsing and cleaning process.

In yet another preferred embodiment according to the first aspect of the present invention, one or more transversal upper struts 32 are arranged at predefined locations along the longitudinal direction of support frame 4; said transversal upper struts 32 connecting the first main support element 16 of the first side of the support frame with the first auxiliary support element 20 of the second side of the support frame.

In yet another preferred embodiment according to the first aspect of the present invention, one or more transversal lower struts 34 are arranged at predefined locations along the longitudinal direction of support frame 4; said transversal lower struts 34 connecting the second main support element 18 of the second side of the support frame with the second auxiliary support element 22 of the first side of the support frame.

Providing the support frame with such upper and/or lower struts 32,34 provides for a more sturdy construction and thus improves the integrity of the support frame and thereby of the conveyor system.

In yet another preferred embodiment according to the first aspect of the present invention, the first main support element 16 of the first side of the support frame, the shielding element 24 and the second main support element 18 of the second side of the support frame are integrally formed in one piece.

Forming these elements in one piece may provide for a cost efficient manufacturing process as well as for less labour house needed in the assembly of the conveyor system. Additionally, this embodiment may provide for a more sturdy construction and thus improves the integrity of the support frame and thereby of the conveyor system.

In still another preferred embodiment according to the first aspect of the present invention, the profile of at least part of the group of elements comprising the first main support element 16 of the first side of the support frame, the shielding element 24 and the second main support element 18 of the second side of the support frame, seen in a transversal direction relative to the longitudinal direction (i.e. in the xz-plane of the support frame 4, exhibits a Z-form.

Providing these elements with a profile exhibiting a Z-form has proven to provide efficiency in production of the involved elements as well as such form provides the possibility that the rinsing eater easily can be drained off the shielding element 24 in a rinsing or cleaning situation.

In still another preferred embodiment according to the first aspect of the present invention, the endless carrier chain to be used in the is a conveyor system selected from the group comprising: a flexible conveyor system, in which the endless carrier chain comprises a number of inter-engaging elements flexibly connected to each other and forming an endless chain; a conveyor belt comprising a polymeric material which may optionally be reinforced, such as by reinforcing wires or a reinforcing web; a lamella belt comprising a number of lamella elements inter-engagingly hinged to one another on one side; a wire belt comprising a number of wires woven together; and any kind of steel belts, such as open or closed steel belts.

Such carrier chains are know per se from the prior art and they have all proven very useful in the present invention.

In still another preferred embodiment according to the first aspect of the present invention, one or more of the elements: first main first main support element 16, second main support element 18, first auxiliary support element 20, second auxiliary support element 22, the shielding element 24, the gutter 30, one or more of the transversal upper struts 32, one or more transversal lower struts 34, are made of steel, such as stainless steel, aluminium, a polymeric material, such as a plastic.

Such materials are well suited for the stated purpose due to their sturdiness, their chemical resistance and anti-corrosion properties.

In still another preferred embodiment according to the first aspect of the present invention, the conveyor system further comprising brushing means for brushing the endless carrier chain 6 on the outer surface 14a at the upper part of the endless carrier chain 6 and/or on the outer surface 14b, at the lower part of the endless carrier chain 6.

In still another preferred embodiment according to the first aspect of the present invention, the conveyor system further comprising carrier chain diverting means for diverting or leading said endless carrier chain 6 into the interior of a rinsing container for rinsing the endless carrier chain 6 with a rinsing liquid.

Such brushing means and chain diverting means provides for easy and even continuously rinsing and cleaning in a processing line even during production and hence during movement under production of the endless carrier chain.

It is preferred that such brushing means and chain diverting means are provided at the lower part of the endless carrier chain.

It is preferred that such brushing means and/or diverting means is/are provided with brushing engaging means and/or carrier chain diversion engaging means for reversibly engaging/disengaging said brushing means and/or said diverting means, respectively.

Such brushing engaging means and/or carrier chain diversion engaging means provides for easy and swift engagement and disengagement of the means and chain diverting means from a rinsing/cleaning operation of the carrier chain to a non-rinsing/non-cleaning operation of the carrier chain.

In one embodiment of the first aspect of the present invention, two or more conveyor systems according to any of the claims 1-X arranged on top of each other, such as 2, 3, 4, 5, 6, 7 or 8 conveyor systems arranged on top of each other.

Such arrangement is advantageous in that space is saved in a processing line of a manufacturing company.

The conveyor system according to the first aspect of the present invention is useful in a conveyor apparatus. Accordingly, the present invention according to the second aspect of the present invention relates to a conveyor apparatus comprising a conveyor system according to the first aspect of the present invention and additionally drive means for moving the endless carrier chain relative to the support frame 4.

Such drive means may be an electrical motor, a hydraulic motor, an air-driven motor or a vacuum motor.

In a third aspect, the present invention relates to the use of a conveyor system according to the first aspect of the present invention or use of a conveyor apparatus according to the second aspect of the present invention for conveying an object.

In a preferred embodiment of the use according to the third aspect, the object is a food or a food precursor.

It is especially useful to use the invention of the first and second aspect of the present invention within the food or dairy industry because high standards of hygiene are required within these industries.

In the following, the present invention will be described with reference to the figures.

FIG. 3 illustrates in a cross-sectional view of an embodiment of the first aspect of the present invention. FIG. 3 shows the support frame 4 having a first side 8 and a second side 10. The support frame extends in a longitudinal direction (i.e. in the y-direction. The support frame supports an endless carrier chain 6. The carrier chain 6 comprises an upper part 6a and a lower part 6b. In the embodiment of FIG. 3 the endless carrier chain comprises a conveyor belt comprising a polymeric material which may optionally be reinforced, such as by reinforcing wires or a reinforcing web. However, any other type of endless carrier chains may be applies as well, such as those defined in the claims.

The support frame comprises a first main support element 16 supporting the upper part of the endless carrier chain at the first side 8 of the support frame; wherein said support frame comprises a second main support element 18 supporting the lower part of the endless carrier chain at the second side 10 of the support frame; wherein said support frame comprises a first auxiliary support element 20 supporting the upper part of the endless carrier chain at the second side 10 of the support frame; wherein said support frame comprises a second auxiliary support element 22 supporting the lower part of the endless carrier chain at the first side 8 of the support frame.

Support struts 26 and 28 serves as supporting and strengthening the integrity of the support frame.

The support frame comprises a shielding element 24 extending from the first side 8 of the support frame to the second side 10 of the support frame in an area A defined between the inner side 12a of the upper part of the endless carrier chain 6 and the inner side 12b of the lower part of the endless carrier chain 6. The shielding element 24 is arranged in such a way that the shielding element 24 itself, or said shielding element 24 in combination with said first main support element 16 and/or in combination with said second main support element 18 having an extension that blocks a direct access between any point P1 located on the inner side 12a of the upper part of the endless carrier chain 6 and a corresponding point P2 located on the inner side 12b of the lower part of the endless carrier chain, said point P2 being the most proximal point, in relation to the point P1, on the inner side 12b of the lower part of the endless carrier chain.

In FIG. 3 the shielding element has a preferred Z-like form.

It is clearly seen from FIG. 1 that in a situation where debris or other kind of dirt, which has been deposited in the upper part of the support frame and/or the upper part of the endless carrier chain, comes off, such debris or dirt is prevented from entering the inside of the lower part of the support frame and/or the lower part of the endless carrier chain by virtue of the shielding element 24 which prevents such entrance.

The same applies during use in a processing line. Once the conveyed product or object, such as a food or food precursor, gives of a little part of material this part may stick to the upper part of the support frame and/or the upper part of the endless carrier chain. However, such material which has fallen off the conveyed product or object will never enter the lower part of the support frame and/or the lower part of the endless carrier chain, because the shielding element 24 will make prevent that this fallen off object or product will enter the lower part of the support frame and/or the lower part of the endless carrier chain.

Furthermore, the openings 26 and 28 clearly provides for good access to the interior of the upper part of the conveyor system (via opening 28) as well as good access to the interior of the lower part of the conveyor system (via opening 26). Such good accesses are beneficial in cleaning processes.

In a rinsing or cleaning situation, the same principle of the shielding element 24 applies. Upon rinsing of the upper part of the support frame and/or the upper part of the endless carrier chain, the rinsing liquid used, such as water or detergent/water will by virtue of the shielding element by directed away from the lower part of the support frame and/or the lower part of the endless carrier chain so that these part will not be contaminated with dirty rinsing water.

All in all the conveyor system of the first embodiment as shown in FIG. 3 provides for an improved hygiene.

Figure 2:
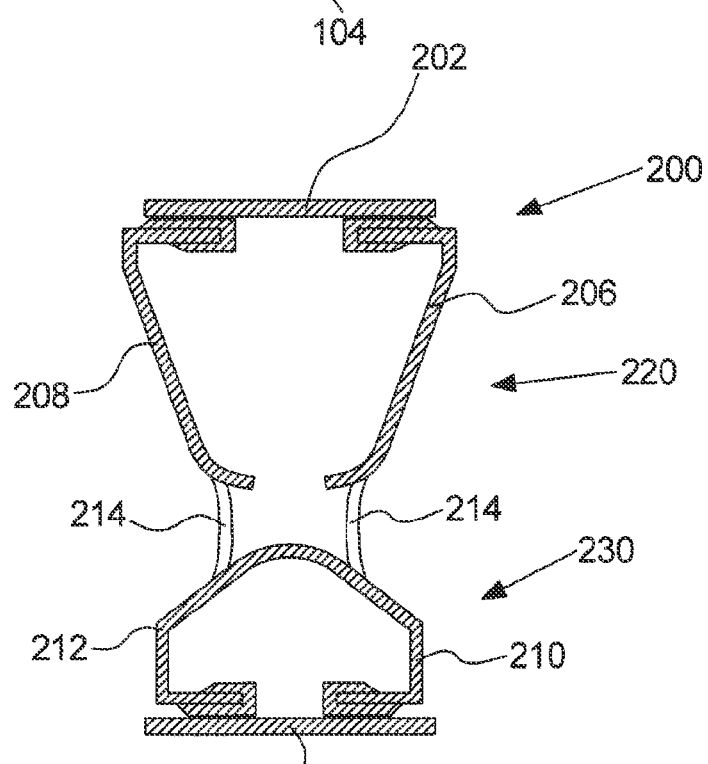
FIG. 2 is a cross-sectional view illustrating the principle of an improved prior art conveyor system.

This is not the case in respect of the prior art systems shown in FIGS. 1 and 2. FIG. 1 shows in a cross-sectional view an example of a prior art conveyor system (the XMX system of Flexlink mentioned in the introduction of the present application.

The prior art system of FIG. 1 comprises a carrier frame which in turn comprises a first side part 106 and a second side part 108. The two side parts are spaced apart so that they together forms an upper longitudinal opening upon which the carrier chain 102 is supported, and a lower longitudinal opening supporting the lower carrier chain 104.

The system of FIG. 1 does not prevent debris from the upper part of the system to reach the lower part of the system. Further, the system of FIG. 1 does not provide good access to the interior of the conveyor system.

An improvement to the system of FIG. 1 is illustrated in FIG. 2. This system corresponds to the XMY system of Flexlink mentioned in the introduction of the present application.

FIG. 2 shows a conveyor system 200 comprising an upper part 220 and a lower part 210.

The upper part of the endless carrier chain 202 is accommodated in an upper part of the support frame 220, whereas the lower part of the endless carrier chain 204 is accommodated in a lower part of the support frame 230. The upper part of the support frame and the lower part of the support frame are completely separated from each other except at specific points located along the longitudinal direction of the support frame, where the two parts are fastened to each other by brackets 214.

The upper part of the support frame comprises two side walls 206,208 at a first side and a second side of the support frame, respectively. The upper part of the support frame thus comprises an opening at the top in which the endless carrier chain 202 is accommodated. As seen in FIG. 2 the lower part of the support frame 230 has a profile defining an opposite V or U. That is, the lower part of the support frame of the system of FIG. 2 is completely closed at the top, but comprises a longitudinal opening at the bottom, in which the lower part of the endless carrier chain 204 is accommodating.

The prior art system of FIG. 2 avoids the problem that debris originating from the upper part of the endless carrier chain deposits onto the lower part of the endless carrier chain.

However, due to its closed structure, and the poor access to the interior of the various parts of the prior art conveyor system of FIG. 2, cleaning and rinsing operations in this system is difficult and restricted.

Figure 5:
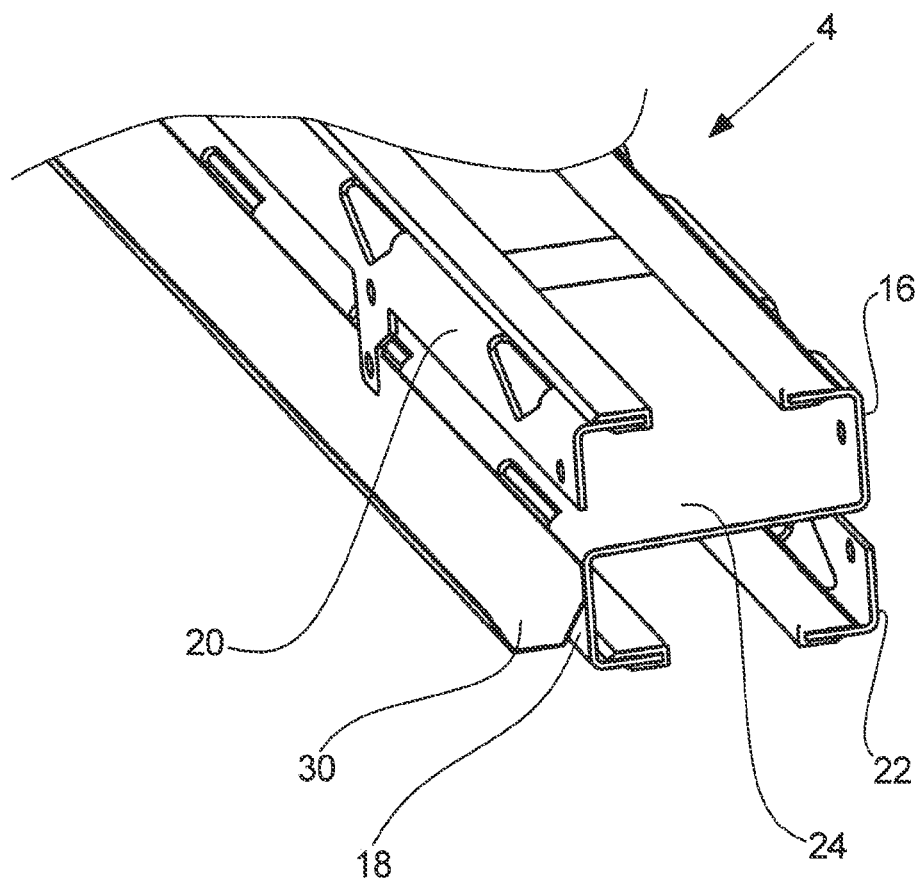
FIG. 5 is a perspective view illustrating the support frame of the embodiment of the conveyor system of FIG. 4.

FIG. 4 shows a cross-sectional embodiment of a conveyor system according to the present invention. In this embodiment the conveyor system is provided with a gutter 30 for collecting debris and/or rinsing liquids originating from the upper part of the conveyor system and lead to the said gutter 30 by the shielding element 24. This embodiment of the system without the corresponding endless carrier chain, i.e. of the corresponding support frame, is depicted in FIG. 5 in a perspective view. The system of FIGS. 3 and 4 as depicted shows presence of gliding means 15. The gliding means 15 provides a smooth surface upon which the endless carrier chain is supported and/or glides.

Figure 6:
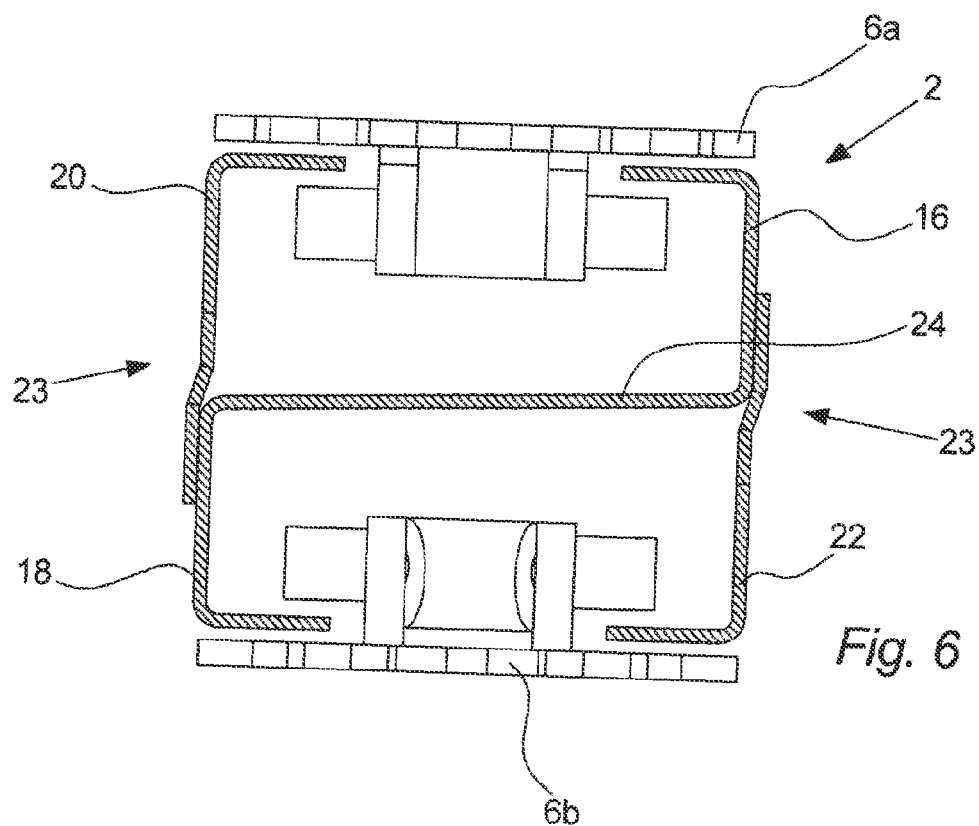
FIG. 6 is a cross-sectional view illustrating an embodiment of the conveyor system according to the first aspect of the present invention wherein the conveyor system comprises an endless carrier chain comprising a number of inter-engaging elements flexibly connected to each other.
Figure 7:
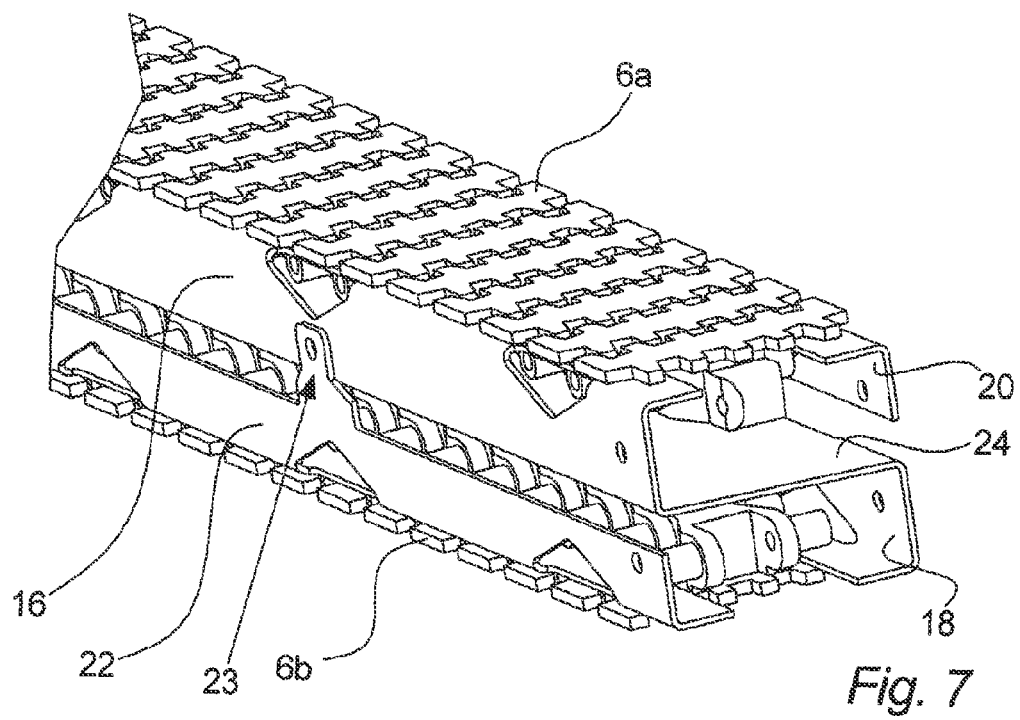
FIG. 7 is a perspective view illustrating an embodiment of the conveyor system of FIG. 6.

In FIGS. 6 and 7 are illustrated in a cross-sectional view and a perspective view respectively an embodiment of the conveyor system according to the first aspect of the present invention. In these figures it is illustrated that the conveyor system may comprise, at one or more specific locations 23 along the first side of the support frame, a connection between the first main support element 16 and the second auxiliary support element 22. Such connections may also or alternatively in a correspondingly way be present at one or more specific locations 23 along the second side of the support frame.

In FIGS. 3 and 4 a Cartesian coordinate system is included to illustrate the various directions of a conveyor system in an intended use as defined in claim 1. Hence, the z-direction defines a vertical direction. The x-y-plane defines a horizontal plane. In FIGS. 1, 2, 3, 4 and 6 the longitudinal direction of the support frame accordingly extends along the y-direction "into and out of the paper".

In a second aspect the present invention relates to a conveyor apparatus comprising a conveyor system according to the invention according to the first aspect of the present invention and drive means for moving the endless carrier chain relative to the support frame.

The conveyor apparatus and the conveyor system according to the invention may be manufactured using materials and manufacturing processes and techniques well known in the art. A person skilled in the art of manufacturing conveyor systems and apparatuses will—on the basis of the present description and the appended claims—know how to manufacture the system and the apparatus according to the first and second aspect of the present invention, respectively.

It will be understood that the invention is not limited to the particular examples described above but may be designed in a multitude of varieties within the scope of the invention, as specified in the claims.

LIST

2. Conveyor system
4. Support frame
6. Endless carrier chain
6a. Upper part of endless carrier chain
6b. Lower part of endless carrier chain
8. First side of support frame
10. Second side of support frame.
12. Inner side of endless carrier chain
12a. Inner side of the upper part of endless carrier chain
12b. Inner side of the lower part of endless carrier chain
14. Outer side of endless carrier chain
14a. Outer side of the upper part of endless carrier chain
14b. Outer side of the lower part of endless carrier chain
15. Gliding means
16. First main support element 18. Second main support element
20. First auxiliary support element
22. Second auxiliary support element
23. Location at which a main support element is connected to the an auxiliary support element.
24. Shielding element
26. Opening at first side of support frame
28. Opening at second side of support frame
30. Gutter
32. Transversal upper struts
34. Transversal lower struts
100. Conveyor system of prior art
102. Upper part of endless drive chain
104. Lower part of endless drive chain
106. First side of support frame
108. Second side of support frame
200. Conveyor system of prior art
202. Upper part of endless drive chain
204. Lower part of endless drive chain
206. First side of upper support frame
208. Second side of upper support frame
210. First side of lower support frame
112. Second side of lower support frame
214. Bracket connecting upper support frame with lower support frame
220. Upper support frame
230. Lower support frame

The invention claimed is:

1. A conveyor system (2) comprising:
a support frame (4) and an endless carrier chain (6);
wherein said support frame extends in a longitudinal direction and comprises a first side (8) and a second side (10);
wherein said endless carrier chain (6) is arranged upon said support frame (4);
wherein in an orientation intended for use, in which the endless carrier chain (6) is arranged in a horizontally orientation, said endless carrier chain (6) defines an upper part (6a) moveable in one direction in relation to said support frame; and a lower part (6b) moveable in the opposite direction in relation to said upper part of said carrier chain; said endless carrier chain thereby having an inner side (12) and an outer side (14);
wherein said support frame comprises a first main support element (16) supporting the upper part of the endless carrier chain at the first side (8) of the support frame;
wherein said support frame comprises a second main support element (18) supporting the lower part of the endless carrier chain at the second side (10) of the support frame;
wherein said support frame comprises a first auxiliary support element (20) supporting the upper part of the endless carrier chain at the second side (10) of the support frame;
wherein said support frame comprises a second auxiliary support element (22) supporting the lower part of the endless carrier chain at the first side (8) of the support frame;
wherein said support frame comprises a shielding element (24) extending from the first side (8) of the support frame to the second side (10) of the support frame in an area A defined between the inner side (12a) of the upper part of the endless carrier chain (6) and the inner side (12b) of the lower part of the endless carrier chain (6);
characterized in that said shielding element (24) itself, or said shielding element (24) in combination with said first main support element (16) and/or in combination with said second main support element (18) having an extension that blocks a direct access between any point P1 located on the inner side (12a) of the upper part of the endless carrier chain (6) and a corresponding point P2 located on the inner side (12b) of the lower part of the endless carrier chain, said point P2 being the most proximal point, in relation to the point P1, on the inner side (12b) of the lower part of the endless carrier chain;
wherein the first side (8) of the support frame (4) comprising an opening (26), extending alongside all said first side in the longitudinal direction, said opening (26) providing access to the inner side (12b) of the lower part (6b) of the endless carrier chain (6);
said opening (26) being defined by the geometry of the first main support element (16), the shielding element (24) and the second auxiliary support element (22); and/or
wherein the second side (10) of the support frame (4) comprising an opening (28), extending alongside all said second side in the longitudinal direction, said opening (28) providing access to the inner side (12a) of the upper part (6a) of the endless carrier chain (6); said opening (28) being defined by the geometry of the second main support element (18), the shielding element (24) and the second auxiliary support element (20).

2. A conveyor system, (2) comprising:
a support frame (4) and an endless carrier chain (6);
wherein said support frame extends in a longitudinal direction and comprises a first side (8) and a second side (10);
wherein said endless carrier chain (6) is arranged upon said support frame (4);
wherein in an orientation intended for use, in which the endless carrier chain (6) is arranged in a horizontally orientation, said endless carrier chain (6) defines an upper part (6a) moveable in one direction in relation to said support frame; and a lower part (6b) moveable in the opposite direction in relation to said upper part of said carrier chain; said endless carrier chain thereby having an inner side (12) and an outer side (14);
wherein said support frame comprises a first main support element (16) supporting the upper part of the endless carrier chain at the first side (8) of the support frame;
wherein said support frame comprises a second main support element (18) supporting the lower part of the endless carrier chain at the second side (10) of the support frame;
wherein said support frame comprises a first auxiliary support element (20) supporting the upper part of the endless carrier chain at the second side (10) of the support frame;
wherein said support frame comprises a second auxiliary support element (22) supporting the lower part of the endless carrier chain at the first side (8) of the support frame;
wherein said support frame comprises a shielding element (24) extending from the first side (8) of the support frame to the second side (10) of the support frame in an area A defined between the inner side (12a) of the upper part of the endless carrier chain (6) and the inner side (12b) of the lower part of the endless carrier chain (6);
characterized in that said shielding element (24) itself, or said shielding element (24) in combination with said first main support element (16) and/or in combination with said second main support element (18) having an extension that blocks a direct access between any point P1 located on the inner side (12a) of the upper part of the endless carrier chain (6) and a corresponding point P2 located on the inner side (12b) of the lower part of the endless carrier chain, said point P2 being the most proximal point, in relation to the point P1, on the inner side (12b) of the lower part of the endless carrier chain;

wherein a gutter (30) is arranged on the second main support element (18) for collection of rinse water in a rinsing situation, said gutter (30) extending in a longitudinal direction of the support frame (4).

3. A conveyor system according to claim 2, wherein said shielding element (24) at least partly in the area A defines a planar surface extending in an inclined orientation, relative to a horizontal plane, from the first side of the support frame to the second side of the support frame.

4. A conveyor system according to claim 2, wherein the first main support element (16) at one or more specific locations (23) along the first side of the support frame is connected to the second auxiliary support element (22) and/or wherein the second main support element (18) at one or more specific locations (23) along the second side of the support frame is connected to the first auxiliary support element (20).

5. A conveyor system according to claim 2, wherein one or more transversal upper struts (32) are arranged at predefined locations along the longitudinal direction of support frame (4); said transversal upper struts (32) connecting the first main support element (16) of the first side of the support frame with the first auxiliary support element (20) of the second side of the support frame.

6. A conveyor system according to claim 2, wherein one or more transversal lower struts (34) are arranged at predefined locations along the longitudinal direction of support frame (4); said transversal lower struts (34) connecting the second main support element (18) of the second side of the support frame with the second auxiliary support element (22) of the first side of the support frame.

7. A conveyor system according to claim 2, wherein the first main support element (16) of the first side of the support frame, the shielding element (24) and the second main support element (18) of the second side of the support frame are integrally formed in one piece.

8. A conveyor system according to claim 2, wherein the profile of at least part of the group of elements comprising the first main support element (16) of the first side of the support frame, the shielding element (24) and the second main support element (18) of the second side of the support frame, seen in a transversal direction relative to the longitudinal direction of the support frame (4), exhibits a Z-form.

9. A conveyor system according to claim 2, wherein the endless carrier chain is a carrier chain selected from the group comprising: a flexible conveyor system, in which the endless carrier chain comprises a number of inter-engaging elements flexibly connected to each other and forming an endless chain; a conveyor belt comprising a polymeric material which may be reinforced by reinforcing wires or a reinforcing web; a lamella belt comprising a number of lamella elements inter-engagingly hinged to one another on one side; a wire belt comprising a number of wires woven together; and any kind of open or closed steel belts.

10. A conveyor system according to claim 2, wherein one or more of the elements: first main support element (16), second main support element (18), first auxiliary support element (20), second auxiliary support element (22), the shielding element (24), the gutter (30), one or more of the transversal upper struts (32), one or more transversal lower struts (34), are made of stainless steel, aluminium, a polymeric material, or a plastic.

11. A conveyor system according to claim 2, further comprising:

brushing means for brushing the endless carrier chain (6) on the outer surface (14a) at the upper part of the endless carrier chain (6) and/or on the outer surface (14b), at the lower part of the endless carrier chain (6).

12. A conveyor system according to claim 11, further comprising:

carrier chain diverting means for diverting or leading said endless carrier chain (6) into the interior of a rinsing container for rinsing the endless carrier chain (6) with a rinsing liquid.

13. A conveyor system according to claim 12, wherein said brushing means and/or diverting means is/are provided with brushing engaging means and/or carrier chain diversion engaging means for reversibly engaging/disengaging said brushing means and/or diverting means, respectively.

14. A conveyor system according to claim 2, further comprising two or more conveyor systems arranged on top of each other.

15. A conveyor system according to claim 2, further comprising drive means for moving the endless carrier chain relative to the support frame (4).

16. A conveyor system according to claim 2, further comprising a conveyor apparatus for conveying an object.

17. A conveyor system according to claim 16, wherein the object is a food or a food precursor.

* * * * *